(12) United States Patent
Tolibas-Spurlock et al.

(10) Patent No.: US 8,245,848 B2
(45) Date of Patent: Aug. 21, 2012

(54) COMPOSTABLE CONTAINER FOR STORING FLUIDS

(75) Inventors: Cynthia Tolibas-Spurlock, Burlingame, CA (US); Bambi Allred-Forsman, Chehalis, WA (US); Darla Agnew-Von Moos, Chehalis, WA (US)

(73) Assignee: Sacred Green, Inc., Chehalis, WA (US)

( * ) Notice: Subject to any disclaimer, the term of this patent is extended or adjusted under 35 U.S.C. 154(b) by 72 days.

(21) Appl. No.: 12/544,150

(22) Filed: Aug. 19, 2009

(65) Prior Publication Data
US 2010/0044267 A1 Feb. 25, 2010

Related U.S. Application Data

(60) Provisional application No. 61/090,871, filed on Aug. 21, 2008.

(51) Int. Cl.
*B65D 65/46* (2006.01)
(52) U.S. Cl. ............... 206/524.7; 264/202; 264/204; 530/373; 427/421.1
(58) Field of Classification Search ............... 427/421.1; 264/202, 204; 530/373
See application file for complete search history.

(56) References Cited

U.S. PATENT DOCUMENTS

| | | | | |
|---|---|---|---|---|
| 2,166,268 A | * | 7/1939 | Simmons | 118/232 |
| 4,483,464 A | * | 11/1984 | Nomura | 222/83 |
| 5,213,858 A | | 5/1993 | Tanner et al. | 428/34.2 |
| 5,409,747 A | | 4/1995 | Pearlstein et al. | 428/34.2 |
| 5,458,933 A | | 10/1995 | Suskind | 428/34.2 |
| 5,540,962 A | | 7/1996 | Suskind | 428/34.2 |
| 5,585,060 A | * | 12/1996 | Takahashi et al. | 264/204 |
| 5,738,921 A | | 4/1998 | Andersen et al. | |
| 6,849,113 B2 | * | 2/2005 | Padua et al. | 106/161.1 |
| 2003/0216492 A1 | | 11/2003 | Bowden et al. | |
| 2005/0011892 A1 | * | 1/2005 | Nakajima et al. | 220/62.22 |
| 2006/0207961 A1 | * | 9/2006 | Kurtz | 215/382 |

FOREIGN PATENT DOCUMENTS

| | | | |
|---|---|---|---|
| DE | 100 31 630 A1 | | 1/2002 |
| JP | 08-002517 | * | 1/1996 |
| JP | 2002-105887 | | 4/2002 |
| JP | 2002105887 | * | 4/2002 |
| JP | 3328070 | | 9/2002 |

(Continued)

OTHER PUBLICATIONS

NatureFlex™ Renewable & Compostable Packaging Films, URL=http://www.foodproductiondaily.com/smartlead/view/198924/4/NatureFlex-Renewable0Compostable-Packa . . . , Download date Jul. 1, 2009.

(Continued)

*Primary Examiner* — Timothy Meeks
*Assistant Examiner* — Nathan T Leong
(74) *Attorney, Agent, or Firm* — Seed IP Law Group PLLC

(57) ABSTRACT

A fully compostable container is provided having an enclosed body with an opening through an interior surface and an exterior surface. The enclosed body having a plant fiber structural layer configured to biodegrade in ambient conditions into nontoxic residue and a fluid barrier layer formed on a first side of the structural layer to form the interior surface of the enclosed body, the fluid barrier layer configured to biodegrade in ambient conditions into nontoxic residue. The container is gradually biodegradable when exposed to a set of factors in a natural environment and has a shelf life of six months when stored under standard commercial conditions.

14 Claims, 6 Drawing Sheets

FOREIGN PATENT DOCUMENTS

JP          2003-103692          4/2003

OTHER PUBLICATIONS

Innovia Films Launch NatureFlex NK Film for Food Wrappers, URL=http://www.ferret.com/au/c/Innovia-Films/Innovia-Films-Launch-NatureFlex-NK-Film-for-Food-Wrappers . . . , Download date Jul. 13, 2009.

Innovia Films, Launch of First Metallised NatureFlex, URL=http://www.packaging-gateway.com/contractors/materials/ubcfilmsplc/press8.html, Article dated Mar. 30, 2006, Download date Jul. 13, 2009.

Innovia launches improved barrier film, URL=http://www.packagingnews.co.uk/materials/news/860256/Innovia-launches-improved-barrier-film/, Download date Jul. 13, 2009.

Twinings' tea is wrapped in compostable film, URL=http://www.greenerpackage.com/compost_biodegrade/twinings_tea_wrapped_compostable_film, Download date Jul. 1, 2009.

NatureFlex™ NE 30, Features—Transparent Heat sealable compostable film, URL=http://www.innoviafilms.com, dated Jan. 2009.

PackWebasia, New Compostable Film Protects Against Moisture, URL=http://packwebasia.com/sustainable-applications/new-compostable-film-protectsagainst-moisture.html, Download date Jun. 30, 2009.

British Plastics & Rubber, Film & Sheet Conversion, "Home compostable film 'is thinner than other equivalents,'" dated Mar. 1, 2009.

Bags, Foodservice Ware, Packaging Films, "What's What and Who's Who in Compostable Products," *BioCycle*, Jul. 2007, pp. 38-45.

PrintingTalk, Acetate Film for Carton Windows is Compostable, A Clarifoil Product Story, URL=http://www.printingtalk.com/news/cif/cif109.html, Article dated Apr. 9, 2008, Download date Jul. 1, 2009.

LabMate Online, Meeting the demand for compostable packaging, URL=http://www.labmate-online.com/news/laboratory-products/3/sirane-limited/meeting-the-demand-for-compo . . . , Article dated May 10, 2009, Download date Jun. 17, 2009.

Processingtalk, "Compostable packaging film on display at Pro2pac, A Sirane Product Story," URL=http://www.processingtalk.com/news/sbp/spb126.html, Article dated Mar. 4, 2009, Download date Jul. 6, 2009.

Clarifoil: Quality Certification, URL=http://www.clarifoil.com/content.asp?ContentID=5&Page=Quality+Statement, Download date Jul. 1, 2009.

Veille Bioplastiques, "The Green Solution for Film Applications—Clarifoil Gains Home Compostability Certification," URL=http://www.bioplastique.wordpress.com/2008/05/19/the-green-solution-for-film-applications-clarifoil-gains-hom . . . , Article dated May 16, 2008, Download date Jul. 13, 2009.

Grafix Plastics, Quality Plastic & Film Sheeting, Biodegradable Acetate Film FAQ, URL=http://www.grafixplastics.com/biodegradable_faq.asp, Download date Jul. 1, 2009.

Mulch Films, URL=http://www.biolice.com/english/mulch1.html, Download date Jun. 17, 2009.

Interpack, Processes and Packaging, "Time to Discover the New Bioplastic Material Biolice® During Interpack 2008 in Dusseldorf From the $24^{th}$ to the $30^{th}$ of April, on Stand 07.AC09," URL=http://www.interpack.com/cipp/md_interpack/custom/pub/content,lang2/oid,8459/ticket,g_u_e_s_t/local_la . . . , Article dated Apr. 18, 2008, Download date Jul. 7, 2009.

Material: Biolice—Ecolect, URL=http://www.ecolect.net/materials/view/biolice, Download date Jul. 7, 2009.

ETAP, Environmental Technologies Action Plan, "Biodegradable alternatives to plastics for farming use: Biolice and BioCoAgri," URL=http://ec.europa.eu/environment/etap, Article dated Jul. 2006, pp. 1-3.

Zein—Wikipedia, the free encyclopedia, URL=http://en.wikipedia.org/wiki/Zein, Download date Jun. 5, 2009.

Spence, K. E. et al., "Dialdehyde starch and zein plastic: Mechanical properties and biodegradability," *Journal of Polymers and the Environment* 3(2):1566-2543, Apr. 1995, Abstract.

Freeman Industries LLC, All About Zein, URL=http://www.freemanllc.com/zein.html, Download date Jun. 30, 2009.

Celiac Sprue Association, "An Update on Edible films," URL=http://www.csaceliacs.org/library/ediblefilms.php, Download date Jun. 23, 2009.

Office of Technology Management at Urbana-Champaign, Multiple-use corn zein-based biodegradable resins, sheets, films are an attractive alternative to plastic, URL=http://www.otm.illinois.edu/node/266, Download date Jun. 22, 2009.

Gaspar, M. et al., "Reducing water absorption in compostable starch-based plastics," *Polymer Degradation and Stability* 90(3):563-569, Dec. 2005, Abstract.

Weaver-Missick, T., "Wax Paper Turns 'Green'," USDA Agricultural Research Service, URL=http://www.ars.usda.gov/IS/pr/2000/000719.htm, Article dated Jul. 19, 2000, Download date Jun. 17, 2009.

Freeman Industries LLC, Cozeen™ 303N, URL=http://www.freemanllc.com/cozen.html, Download date Jun. 30, 2009.

Freeman Industries LLC, Vegetable Protein Process (*VPP), URL=http://wwwfreemanllc.com/vpp.html, Download date Jun. 30, 2009.

Office of Technology Management, University of Illinois at Urbana-Champaign, Corn zein-based biodegradable resins, sheets, and films, URL=http://www.otm.uiuc.edu, copyright 2005-2006.

APTI, Advanced Prototype Technologies, Inc., Quote #Q2907-2 prepared for Stratos, dated Jul. 6, 2009.

Global Protein Products, Inc., Zein a natural biopolymer from a renewable resource, URL=http://www.globalprotein.com/zein.html, Download date Jul. 6, 2009.

Freie Universitat Berlin, "Alternative Polymers and Processes for Coating," URL=http://www.diss.fu-berlin.de/diss/receive/FUDISS_thesis_000000002347, Article dated Jul. 21, 2008, Download date Jun. 23, 2009.

Bai, Jinhe et al., Formulation of Zein Coatings for Apples, USDA Agricultural Research Service, URL=http://www.ars.usda.gov/research/publications/Publications.htm?seq_no_115=131813, Article Dated May 1, 2003, Download date Jun. 23, 2009.

Biodegradable Plastic—Wikipedia, the free encyclopedia, URL=http://en.wikipedia.org/wiki/Biodegradable_plastic, Download date Jul. 1, 2009.

Innovia Films, Home Biodegradable/Sustainable Market Application Compostability, URL=http://www.innoviafilms.com/products/market/biodegradablesustainable/brand/compostability/home-compo . . . , Download date Jul. 1, 2009.

Association for Organics Recycling, "Home compostable packaging and plastics," URL=http://www.organics-recycling.org.uk/index.php?option=com_content&view=article&id=110:home-compos . . . , Download date Jul. 1, 2009.

Resource Magazine, "Breaking Down," Issue 30, Jul.-Aug. 2006, URL=http://www.resourcepublishing.co.uk/eresource/eresourcearticle.html, Download date Jun. 17, 2009.

Food Service Warehouse (FSW), Commercial Composting Facilities, URL=http://www.foodservicewarehouse.com/education/going-green/commercial-composting.aspx, Download date Jun. 11, 2009.

Nova Science in the News, Making packaging greener—biodegradable plastics, Australian Academy of Science, URL=http://www.science.org.au/nova/061/061glo.htm, Download date Jun. 11, 2009.

World Centric, "PLA Energy Usage Comparison," URL=http://worldcentric.org/sustainability/manufacturing/PLA, Download date Jul. 8, 2009.

Biodegradability and Compostability, General Information about Testing and Certification, URL=http://www.biotec.de/engl/products/ba_allg_engl.htm, Download date Jun. 17, 2009.

British Plastic Federation, "Packaging waste directive and standards for compostability," URL=http://www.bpf.co.uk/Topics/Standards_for_compostability.aspx, Download date Jul. 1, 2009.

Bioplastics (PLA), URL=http://www.worldcentric.org/biocompostables/bioplastics, Download date Jun. 5, 2009.

Association for Organics Recycling, "What is the Association's position on compostable packaging?" URL=http://www.organics-recycling.org.uk/index/php?option=com_content&view=article&catid=40%3Apackagi..., Article dated Apr. 8, 2008, Download date Jul. 1, 2009.

Biodegradable Products Institute, "D6868—Biodegradable Plastics," URL=http://bpiworld.org/Default.aspx?pageId=190424, Download date Jul. 8, 2009.

Biodegradable Products Institute, "ASTM D6400—Test for Compostability," URL=http://bpiworld.org/Default.aspx?pageId=190422, Download date Jul. 8, 2009.

ASTM International, "ASTM D 6400-04, Standard Specification for Compostable Plastics," URL=http://www.astm.org/Standards/D6400.htm, Download date Jul. 8, 2009.

ASTM International, "ASTM D6868-03, Standard Specification for Biodegradable Plastics Used as Coatings on Paper and Other Compostable Substrates," URL=http://www.astm.org/Standards/D6868.htm, Download date Jul. 8, 2009.

Plastarch Manufacturer, URL=http://www.ecplaza.net/search/0slnf20sell/plastarch.html, Download date Jun. 18, 2009.

BPIWorld.org, The Biodegradable Products Institute, Approved Products—Resins, URL=http://www.bpiworld.org/BPI-Public/Approved/3.html, Download date Jun. 12, 2009.

BPIWorld.org, The Biodegradable Products Institute, Approved Products—Compostable Bags, URL=http://www.bpiworld.org/BPI-Public/Approved/1.html, Download date Jun. 12, 2009.

BPIWorld.org, The Biodegradable Products Institute, Approved Products—Foodservice, URL=http://www.bpiworld.org/BPI-Public/Approved/2.html, Download date Jun. 12, 2009.

Biopia, Paper Cups & Lids, URL=http://www.2wplastic.com/paper_cups&lids_paper_hot-cups.htm, Download date Jun. 30, 2009.

Sustainable Plastics: Companies, "Biobased Product Companies," URL=http://www.sustainableplastics.org/companies/, Download date Jun. 8, 2009.

EPIC, Environment and Plastics Industry Council, "Technical Report, Biodegradable Polymers: A Review," dated Nov. 24, 2000, 11 pages.

Baldwin, E. A., "Use of Edible Coating to Preserve Pecans at Room Temperature," *HortScience* 41(1):188-192, 2006.

Nova Science in the News, Australian Academy of Science, "Making packaging greener—biodegradable plastics," URL=http://www.science.org.au/nova/061/061key.htm, Download date Jun. 11, 2009.

Marsh, K. Ph.D. et al., "Food Packaging—Roles, Materials, and Environmental Issues," *Journal of Food Science* 72(3):R39-R55, 2007.

PackagingKnowledge, "Degradable & Biodegradable Bags," URL=http://www.packagingknowledge.com/degradable_biodegradable_bags.asp, Download date Jul. 1, 2009.

Mohee, R. et al., "Biodegradability of biodegradable/degradable plastic materials under aerobic and anaerobic conditions," *Waste Management* 28(9):1624-1629, 2008, Abstract.

Shogren, R. L., et al., "Biodegradable paper/polymerized vegetable oil mulches for tomato and pepper production," *Journal of Applied Horticulture* 8(1):12-14, Jan.-Jun. 2006.

Lavoisier, P., Comparison Chart for Biodegradable Materials, Ideas International, dated Dec. 12, 2006.

Association for Organics Recycling, "Suitable applications for compostable packaging," URL=http://organics-recycling.org.uk/index.php?option=com_content&view=article&catid=40%3Apackagi..., Article dated Apr. 8, 2008, Download date Jul. 1, 2009.

Innovia Films, "Natureflex biodegradable cellulose-based film from Innovia Films," URL=http://www.ferret.com.au/c/Innovia-Films/Natureflex-biodegradable-cellulose-based-film-from-Innovia-Fil..., Download date Jul. 2, 2009.

"San Francisco's County Ordinance Creates Demand for Biodegradable Plastic," PRWEB, dated Feb. 16, 2007.

KPR Adcor Inc., "Choosing the Right Biodegradable Plastic," URL=http://www.corrosionvci.com/bio_films.htm, Download date Jul. 1, 2009.

Weber, C. J., "Biobased Packaging Materials for the Food Industry," The Royal Veterinary and Agricultural University, Department of Dairy and Food Science, Frederiksberg, Denmark, Nov. 2000, pp. 1-5.

Vincotte, Ok Compost Home, dated Jun. 25, 2009, pp. 45-58.

Excellent Packaging & Supply (EPS) Product Catalog, dated Sep. 1, 2008.

EcoPure by Bio-Tec, Biodegradable Plastic, URL=http://www.biotec.biz/, download date Jul. 8, 2009.

Earthencare Inc., 100% Degradable Bag, URL=http://www.earthncare.com/resources.html, download date Aug. 1, 2009.

Maverick Enterprises, Biodegradable Plastics, URL=http://www.maverickent.net/page4.html, download date Jul. 1, 2009.

Plantic Technologies, Plantic Sheet for Thermoforming, URL=http://www.plantic.com.au/customers-applications/plantic-sheet-for-thermoforming, download date Jun. 18, 2009.

Leaversuch, R., "Biodegradable Polyesters: Packaging Goes Green," *Plastics Technology Online*, Sep. 2002, URL=http://www.plasticstechnology.com/articles/200209fa3.html, download date Jun. 3, 2003.

Bioplastic, Wikipedia, the Free Encyclopedia, URL=http://en.wikipedia.org/wiki/Bioplastic, download date Jun. 12, 2009.

Polylactic Acid, Wikipedia, the Free Encyclopedia, URL=http://en.wikipedia.org/wiki/Polylactic acid, download date Jun. 5, 2009.

Weber, R., Laboratory Composting of Polylactic Acid Industrial Agricultural Products Center, URL=http://agproducts.unl.edu/compost.htm, download date Jun. 5, 2009.

Polyhydroxyalkanoates, Wikipedia, the Free Encyclopedia, URL=http://en.wikipedia.org/wiki/Polyhydroxyalkanoates, download date Jun. 18, 2009.

Polyglycolide, Wikipedia, the Free Encyclopedia, URL=http://en.wikipedia.org/wiki/Polyglycolide, download date Jun. 5, 2009.

Plastarch Material, Wikipedia, the Free Encyclopedia, URL=http://en.wikipedia/org/wiki/Plastarch_material, download date Jun. 5, 2009.

Polyhydroxybutyrate, Wikipedia, the Free Encyclopedia, URL=http://en.wikipedia.org/wiki/Poly-3-hydroxybutyrate download date Jun. 5, 2009.

Biopol, Plastics Wiki, URL=http://plastics.inwiki.org/Biopol, download date Jun. 18, 2009.

Avemous, Pr. Luc, *Bioplastics: Biodegradable polyesters(PLA, PHA, PLC...)*, URL=http://www.biodeg.net/bioplastic/html, download date Jun. 18, 2009.

Avemous, Pr. Luc, *Biodegradable polymers(Biopolymers)*, URL=http://www.biodeg.net/biopolymer.html, download date Jun. 18, 2009.

Plastral Pty Ltd. Novamont Mater-Bi Bioplastic, URL=http://www.plastral.com.au/bioplastics.htm, download date Mar. 9, 2010.

Biobag, BiobagUSA, URL=http://www.biobagusa.com/mater-bi.htm, download date Jun. 18, 2009.

BPIWorld.org, The Biodegradable Products Instittute, URL=http://www.bpiworld.org/BPI-Public/Approved/4.html, download date Jun. 12, 2009.

Michigan Green Safe Products, Eco Beverage Cups made with NatureWorks PLA, URL=http://www.michigangreensafeproducts.com/cold_i.html, download date Jun. 23, 2009.

Michigan Green Safe Products, Eco Food Containers made with NatureWorks PLA, URL=http://www.michigangreensafeproducts.com/food_i.html, download date Jun. 23, 2009.

Michigan Green Safe Products, Plates and Carry out Containers made with Bagasse, URL=http://michigangreensafeproducts.com/plates_i.html, download date Jun. 23, 2009.

Cortec Corporation, Certified Compostable Packaging Technologies, URL=http://www.cortecVCI.com, created Dec. 2006.

Eco Film and Eco Works Bags and Film, High Performance Biodegradable and Compostable Packaging Solutions, URL=http://simplybiodegradable.com/products-cx.html, download date Jun. 2, 2009.

Lifegoggles, Environmentally Friendly Plastic Bottles, URL=http://www.lifegoggles.com/699/environmentally-friendly-plastic-bottles/, download date Jun. 5, 2009.

BioTuf, Tough on Trash, Easy on the Environment, URL=http://www.heritage-bag.com/biotuf.htm, download date Jun. 30, 2009.

Lake Chemicals & Minerals, Compostable Plastic Packaging Fit for Purpose and at Affordable Prices, Jun. 2003, URL=http://www.lakecm.co.uk/index.html, download date Jun. 30, 2009.

Clearbags, Biodegradable Shrink Film, URL=http://www.clearbags.com/shrink-film/biodegradable-shrink-film, download date Jul. 1, 2009.

Roplast Industries, Biodegradable/Compostable Film & Bags, URL=http://www.roplast.com/BIODEGRADABLE_COMPOSTABLE_FILM_BAGS/index.html, download date Jul. 1, 2009.

Biopia Biobags, URL=http://www.2wplastic.com/pla_bio_bags.htm, download date Jun. 17, 2009.

Plastic Technologies, Inc., Evaluation of BioD Additive, issued May 22, 2008, URL=http://www.plastictechnologies.com.

Cereplast, the Renewable Plastic, URL=http://www.cereplast.com/homepage.php, download date Jun. 12, 2009.

Royte, E., "Corn Plastic to the Rescue, Wal-Mart and others are going green with 'biodegradable' packaging made from corn. But is this really the answer to America's throwaway culture?" *Smithsonian Magazine*, Aug. 2006, URL=http://www.smithsonianmag.com/science-nature/plastic.html, download date Jun. 5, 2009.

Biota Spring Water, Compostable Bottle, Frequently Asked Questions, URL=http://www.biotaspringwater.com/?q=bottle, download date Jun. 5, 2009.

DuPont Biomax sheet, resins, and modifiers, URL=http://www2.dupont.com/Biomax/en_US, download date Jun. 18, 2009.

Bagasse, URL=http://en.wikipedia.org/wiki/Bagasse, download date Jun. 11, 2009.

Enviropak Corporation, Molded Pulp protective packaging, Four Basic Types of Molded Pulp, URL=http://www.enviropak.com/?gclid=CKiK1fWfhZsCFRYiagod_2ZVqA download date Jun. 12, 2009.

Biopack, Environment Solutions Inc., URL=http://www.biopackamerica.com/product_characteristics.php, download date Jun. 29, 2009.

Simply Biodegradable LLC, Sugar Cane/Reed Dishware, URL=http://www.simplybiodegradable.com/index.html, download date Jun. 18, 2009.

EarthCycle, Compostable Palm Fiber Packaging Products, URL=http://www.earthcycle.com/products.html, download date Jun. 29, 2009.

Earth to Earth Pack Biodegradable Products, URL=http://www.earthtoearthpack.com/cms/products.html, download date Jun. 29, 2009.

FiberCel Packaging LLC, Biodegradable-Protective Packaging, URL=http://www.fibercel.com/why.php, download date Jun. 23, 2009.

Avnipack—Natural Packaging for Our Future, URL=http://www.avnipack.co.uk/products/, download date Jun. 23, 2009.

Arrow Tableware, Single time use disposable products made from renewable plant material of sugarcane, URL=http://www.arrowtableware.com/products.php, download date Jul. 2, 2009.

StalkMarket, Earth Friendly Products, Frequently Asked Questions, URL=http://www.stalkmarketproducts.com/faq.htm, download date Jun. 19, 2009.

Nolan-ITU Pty Ltd., Biodegradable Plastics—Developments and Environmental Impacts, Oct. 2002, URL=http://www.environment.gov.au/settlements/publications/waste/degradables/biodegradable/chapter2.html, download date Jun. 11, 2009.

*Aiding the Environment: Green Food Packaging Aiming to Save the Planet*, Earth to Earth Pack, Biodegradable Starch-Based Blends, URL=http://www.earthtoearthpack.com/cms/Biodegradable_Starch_Based_Blends.html, 2008, download date Jun. 11, 2009.

Biostarch, Water Soluble Film, URL=http://www.biostarch.com/index.php?event=ourproducts, download date Jun. 30, 2009.

Express Greenpak, Biodegradable Starch-Based Non-Woven Fabric Shopping Bags, URL=http://www.expressgreenpak.com/biodegradable_strach_based_plastic bags_html, download date Jun. 22, 2009.

Express Greenpak, PLA Biodegradable Foodservice Containers, URL=http://www. Expressgreenpak.com/biodegradable_bagasse_foodservice_containers.html, download date Jun. 22, 2009.

Express Greenpak, Biodegradable Foodservice Containers, Bamboo Pulp Biodegradable Foodservice Containers, URL=http://www.expressgreenpak.com/bamboo_pulp_biodegradable_foodservice_containers.html, download date Jun. 22, 2009.

Express Greenpak, Biodegradable Paper Boxes, URL=http://www.expressgreenpak.com/recycle_paper_boxes.html, download date Jun. 22, 2009.

Express Greenpak, Bamboo/Fiber Pulp Biodegradable Protective Cushions, URL=http://www.expressgreenpak.com/bamboo-fiber_pulp_biodegradable_protective_cushions.html, download date Jun. 22, 2009.

Branch, Sustainable Design for Living, Biodegradable Fork, Knife & Spoon, URL=http://www.branchhome.com/index.php?main_page=product_info&products_id=21, download date Jun. 11, 2009.

Biosphere Industries, LLC, Renew-a-Pak Biodegradable Rigid Packaging, URL=http://www.biosphereindustries.com/index.htm, download date Jul. 2, 2009.

EarthShell, Single Use Dinnerware, 2009, URL=http://www.earthshell.com, download date Jul. 2, 2009.

Integrated Cassava Project, Cassava Starch in Paper, Textile and Adhesives Industries, URL=http://www.cassavabiz.org/postharvest/starch01.htm, download date Jun. 29, 2009.

Simply Biodegradable, Cornstarch and Wooden Utensils, Dishware, and Bags, URL=http://www.simplybiodegradable.com/products-csw.html, download date Jun. 18, 2009.

Innovia Films, Biodegradable/Sustainable Market Application Compostability, URL=http://innoviafilms/com/products/market/biodegradablesustainable/brand/compostability/home-compo . . . , download date Jul. 1, 2009.

Compostable Natureflex Film Wraps Vegware's Biodegradable Cutlery Sets, URL=http://thepackagingcommunity.org/packaging/index/php?option=com_content&view=article&id113 . . . , download date Jul. 1, 2009.

1964 print advertisement entitled "New Kleenex tissues won't break through!," available for purchase on eBay, 3 pages (http://www.ebay.com/itm/Kleenex-Tissues-1964-print-ad-magazine-ad-Harry-James-trumpet-/110826940366?pt=LH_DefaultDomain_0&hash=item19cdcce7ce; retrieved Feb. 28, 2012).

"Bounty Commercial—Littlest Ninja," Mar. 19, 1993, 2 pages (http://www.youtube.com/watch?v=52O5JLhwLCQ; retrieved Feb. 23, 2012).

"Pollution Prevention," Metropolitan Wastewater Management Commission, © 2010, 2 pages (http://www.mwmcpartners.org/pollution_prevention.html; retrieved Feb. 23, 2012).

"Kleenex Brand FAQ," Kleenex.com, © 2011, 2 pages (https://kleenex.com/FAQ.aspx; retrieved Feb. 23, 2012).

* cited by examiner

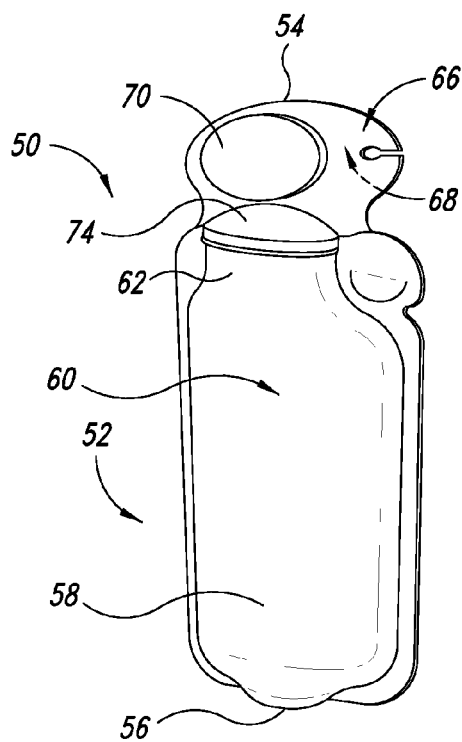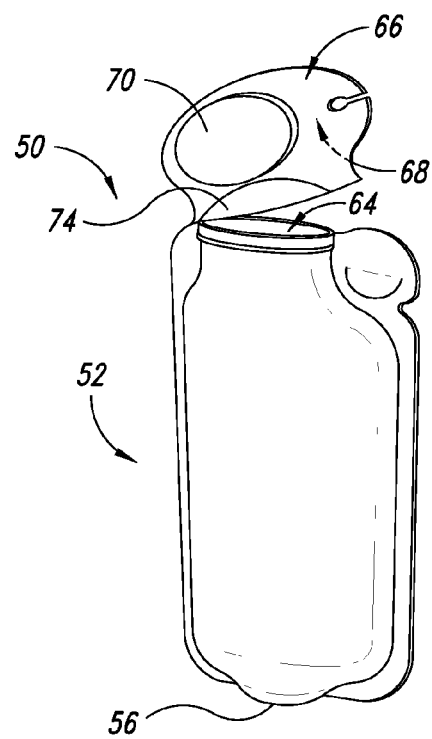
*FIG. 6A*  *FIG. 6B*
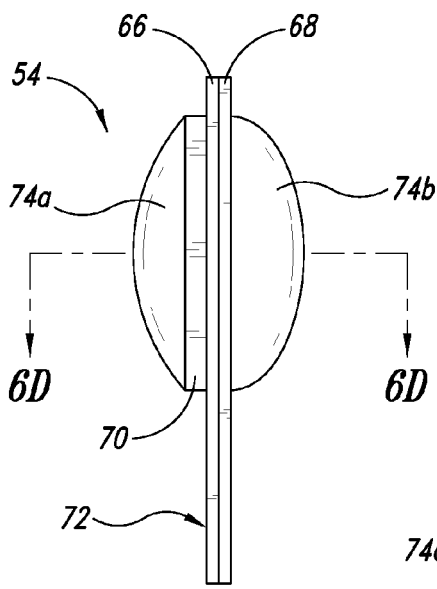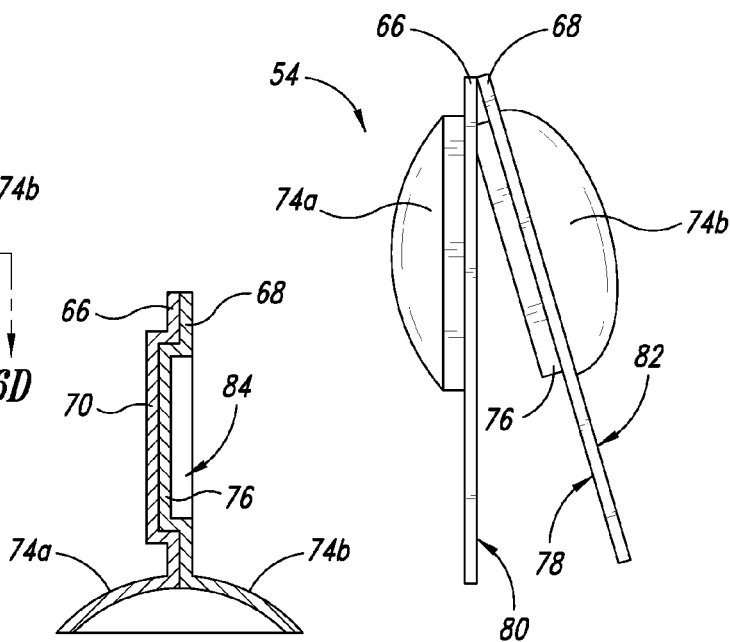
*FIG. 6C*  *FIG. 6D*  *FIG. 6E*

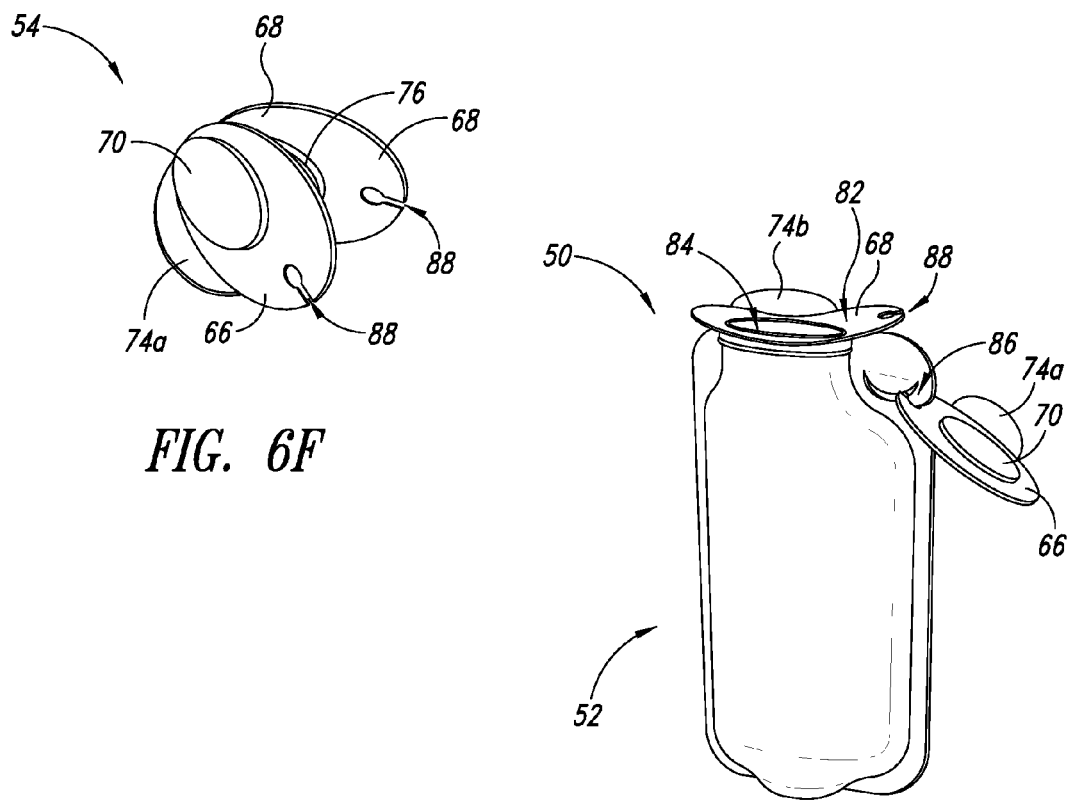
FIG. 6F
FIG. 6G
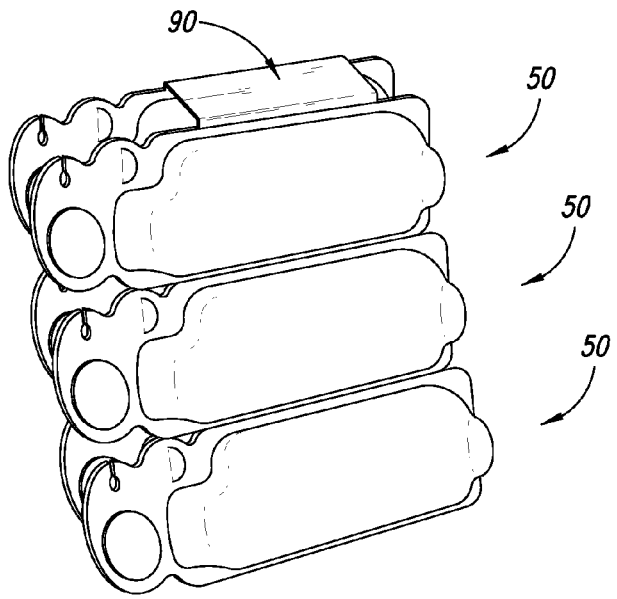
FIG. 7

COMPOSTABLE CONTAINER FOR STORING FLUIDS

TECHNICAL FIELD

The present invention generally relates to the field of biodegradable articles, particularly relating to a fully biodegradable container for storing fluids, where the container has a predetermined shelf-life, after the expiration of which the container biodegrades gradually into organic material.

BACKGROUND

Waste pollution is considered a serious threat in our modern age. A growing population leads to an increase in consumption and an increase in household waste, including containers and bottles. The waste stemming from such consumption negatively impacts our environment.

A particular problem is the growing consumption of plastic containers for bottled water. Due to rising health concerns related to the quality of tap water in recent decades, an alarming rate of people have begun to consume bottled water. The discarded plastic water bottles are harmful to the environment. Not only do wasted plastic containers fill up our landfills, but they also frequently cause water contamination as they end up in water streams. Moreover, plastic water bottles and other plastic containers are petroleum-based products and as such are of a toxic nature, capable of harming not only a natural habitat, but also its inhabitants.

The problem of water contamination as well as the sheer volume of consumption is particularly exhibited in the problematic nature of the Great Pacific Garbage Patch, situated in the North Pacific Ocean. The Great Pacific Garbage Patch has been formed substantially by plastic waste products, particularly plastic containers for bottled water. Samples taken from the Great Pacific Garbage Patch in 2001 reveal that the mass of plastic waste exceeded that of zooplankton, which is the dominant animal life in the area.

The plastic waste products encompassed by this enormous patch are subject to plastic photodegradation, which causes the plastic waste products to degrade into small toxic plastic polymers. Over time, the plastic polymers are broken down into smaller and smaller pieces. However, the polymers do not decompose into materials found in nature. These small toxic plastic polymers concentrate in the upper water column and are ultimately ingested by aquatic organisms which reside near the ocean's surface. Plastic waste thus enters the food chain. Furthermore, many larger aquatic animals, such as Orcas, consume the plastic waste during hunting activity, the consumption of which plastic waste is extremely harmful. The floating particles of plastic waste also frequently resemble zooplankton, which can lead to them being consumed by jellyfish, presenting another venue for entering the ocean food chain. Besides ingestion, other concerns caused by plastic waste ending up in water systems include the frequent entanglement of wildlife.

The degradation of plastic waste also contaminates the air and the soil. As the plastic waste degrades, it can release toxic pollutants, such as greenhouse gases. As mentioned above, over time the plastic degrades into smaller and smaller toxic plastic particles, never returning to compounds found in nature.

Landfills contain a tremendous amount of plastic waste. As the plastics degrade, the pollutants leach into the soil and the gases escape into the air. As a response to this threat, recycling has been introduced into the consumption cycle. Recycling generally involves processing used materials into new products. However, the processing of waste can be economically ineffective, as it entails various mechanisms, such as collecting the waste, sorting the waste according to provided specifications, and the final stage of processing the waste into materials that can be used in new products. Aside from the ineffective processes, recycling is not widely available in all communities, and if available, often is not mandatory. Thus, many individuals either do not have a convenient venue for recycling or simply choose not to recycle.

Recycling has its disadvantages as well. The sorting and shipping of the plastic waste to the appropriate recycling facility is costly, both monetarily and environmentally. Different types of plastics must be recycled separately because the different types do not cooperate to form a stable reusable plastic. In addition, many plastics have a limited recyclable life. For example, recycling plastic water bottles can result in a lower grade plastic that can not be converted into a new plastic water bottle.

Other methods of preventing pollution include the partial use of biodegradable material in plastic products. Certain auxiliary elements are made of biodegradable material and are then incorporated within the container, while the remainder of the container is substantially plastic based on petroleum. If these mixed products are included with other plastics for recycling, they can contaminate the product and render it unusable.

A company by the name of BIOTA advertises that it uses a corn-based PLA (polylactic acid) to produce bottles for its water products. It states that such a water bottle can degrade within 75 to 80 days in commercial composting conditions. However, in order to degrade, the bottles need to be placed under specific industrial processing conditions, including being subjected to high heat, particular micro-organisms, and high moisture levels. Furthermore, elements such as the cap are not degradable. These bottles include elements that are not fully biodegradable under standard environmental conditions and they are also expensive. This creates a disincentive for consumers to switch away from petroleum-based plastic bottles.

These products, also known as bioplastics, are biodegradable in commercial composting facilities that carefully monitor the temperature, pressure, and moisture levels. If such products are not correctly sorted by the consumer, and thus end up in an ordinary landfill rather than in a composting facility, they will not degrade for years. Due to the limited access to recycling by some consumers and the problems with recycling plastics in general, there is a need for a biodegradable water bottle that will decompose into nontoxic residues in ambient conditions.

BRIEF SUMMARY

One advantage of the present invention is to provide a fluid storing container that is fully biodegradable, including all auxiliary components. Another advantage of the present invention is to provide low production costs reflected in the consequential price of the container, thereby creating an incentive for consumers to switch from the commonly used petroleum-based plastic bottles. The container fully biodegrades when exposed to standard environmental conditions or ambient conditions in a garden, on a lawn, in a compost bin, or when it is exposed to other outdoor weather conditions.

According to an aspect of the present invention, a container has a body, a base, a mouth, and a cap, all of which are biodegradable. The body is made of a biodegradable plant fiber based structural material having an inner and an outer surface. The structural material is inexpensive and thus decreases production costs. The structural material provides a solid mechanical support for holding the fluid in the container. While mere contact with fluids does not initiate the disintegration of the biodegradable structural material, if directly exposed to fluids for an extended period of time, the structural material will begin to disintegrate. In order to prevent direct contact between the biodegradable structural material and the fluid in the container, a thin coating is provided on the inner surface thereof. The coating is made of a biodegradable film or sprayable resin that is substantially fluid repellant. The biodegradable film has a predetermined shelf life, such as six months, and during its shelf life is insoluble in fluids and temperature resistant, thus neither dissolving nor disintegrating. After its shelf life it will begin to biodegrade.

The mouth and cap are made of a solid biodegradable material, such as potato starch. Although the mouth and cap are only occasionally in direct contact with the fluid in the container for a period of time, they embody biodegradable properties so that they have a predetermined shelf life, such as six months, and neither dissolve nor disintegrate during that time under standard conditions.

Another advantage of the structural material is that when the container is exposed to natural, outdoor conditions, the biodegradable structural material accumulates substantial amounts of moisture. The moisture in turn affects the coating on the inner surface of the cardboard and accordingly rapidly increases degradation of the inner coating. Similarly, the moisture level absorbed by the structural material can increase the rate of degradation of the mouth and cap.

The present invention eliminates the need for special high heat composting conditions and instead enables individuals to simply compost the containers for bottled water or other fluids in natural environmental conditions. In effect, individuals will be able to compost the present invention in their own backyard or garden. Since the present invention includes neither plastic nor a non-biodegradable polyester, greenhouse gas emissions originating from plastic or otherwise biodegradable waste are also diminished.

BRIEF DESCRIPTION OF THE DRAWINGS

FIGS. 6A-6B are an alternative embodiment of a biodegradable container having a multipurpose lid.

FIG. 6C is a top view of the multipurpose lid in FIGS. 6A-6B.

FIG. 6D is a cross section of the multipurpose lid of FIG. 6C taken through 6D-6D.

FIG. 6E is a top view of the multipurpose lid in a partially open position.

FIG. 6F is an orthogonal top view of the multipurpose lid in a partially open position.

FIG. 6G is the container of FIGS. 6A-6B with the multipurpose lid in a resealed position.

FIG. 7 is an orthogonal view of a group of biodegradable containers of FIG. 6A.

DETAILED DESCRIPTION

Figure 1:
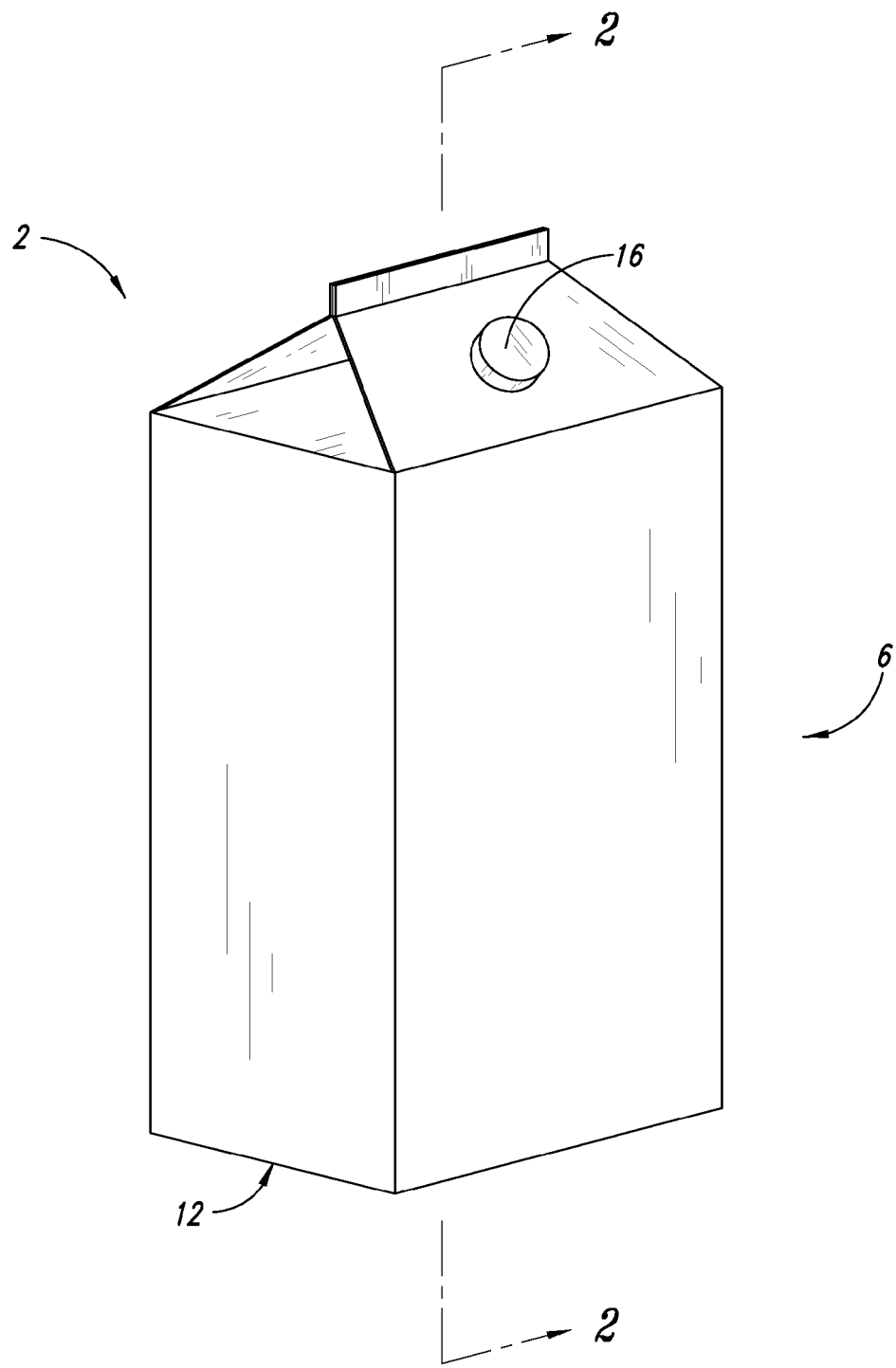
FIG. 1 is an orthogonal view of a biodegradable container according to one embodiment of the invention, the container having a substantially rectangular body with a triangular upper region, and a mouth extending from and being perpendicular to one side of the upper region.

In the following description, certain specific details are set forth in order to provide a thorough understanding of various embodiments of the disclosure. However, one skilled in the art will understand that the disclosure may be practiced without these specific details. In other instances, well-known structures associated with techniques for manufacturing containers have not been described in detail to avoid unnecessarily obscuring the descriptions of the embodiments of the present disclosure.

Unless the context requires otherwise, throughout the specification and claims that follow, the word "comprise" and variations thereof, such as "comprises" and "comprising," are to be construed in an open, inclusive sense, that is, as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

In the drawings, identical reference numbers identify similar elements or acts. The size and relative positions of elements in the drawings are not necessarily drawn to scale.

FIGS. 1-4 illustrate alternative configurations for a container 2 made completely of biodegradable materials according to the invention. The container 2 has a base 12, a body 6, a mouth 14, and a cap 16, all of which are made of biodegradable material. A plurality of biodegradable materials may be used.

All of the components used to manufacture and assemble this container 2 are biodegradable in ambient conditions into nontoxic constituents. More particularly, the container 2 is compostable in the average family's backyard, under normal outdoor weather conditions. The term biodegradable is intended to encompass the degradation of material from naturally occurring microorganisms, such as bacteria, fungi, or algae, over a period of time in natural conditions. Composting is a natural process that turns organic materials into a substance often called humus. Fertile soil is rich in humus, providing a reservoir of stabilizing material that imparts beneficial physical, chemical, and biological properties to soil. Composting occurs through the aerobic activity of microorganisms that require oxygen, moisture, and food in order to thrive. These conditions can be achieved in backyard compost bins or piles. As the microorganisms grow they produce heat, water, and carbon dioxide, while transforming the starting materials into compost that can be used as a stable soil conditioner.

Composting in a backyard is achieved in ambient conditions that include temperature, pressure, and moisture, to name a few. The container 2 will decompose in a consumer's backyard into compost without applying additional heat or extensive monitoring of the composting process. Ambient temperature for backyard composting is in the range of 20-30 degrees Celsius (65-90 degrees Fahrenheit). Some prior art containers advertise as being "biodegradable," but in fact, all such containers require special treatment and commercial compositing facilities to begin the biodegradation process. These containers will not biodegrade on their own under normal outdoor conditions. In contrast to the present invention, commercial composting facilities require maintained temperatures above 60 degrees Celsius, usually over 150 degrees Fahrenheit, careful monitoring of moisture, and regulation of the microorganisms. These commercial facilities regularly aerate and turn the compost, regulate the airflow, and balance the nitrogen and carbon containing materials. The additional heat and careful monitoring are expensive and time consuming. In addition, the commercial compositing facilities rely on consumers to recycle the products. If a biodegradable product is not recycled to a commercial facility, the product remains in a landfill for many years before the decomposition process naturally begins. Accordingly, a container that is compostable under normal conditions is quite different from a container that is called "biodegradable" or is compostable in a commercial system.

As the inventive container 2 biodegrades naturally, no harmful chemicals or metals are left behind. The container 2 will decompose into water and organic matter; the combined residues of organic materials that have lost their original structure will then undergo rapid decomposition into simpler ingredients.

As a result of decomposing into nontoxic residues, the container 2 and its associated components, like the mouth 14 and the cap 16, can be composted anywhere. A consumer can compost container 2 in their backyard or they can throw it away. The container 2 will decompose into nontoxic residues in landfills or along the side of a highway. These nontoxic residues are beneficial to plants and the environment. Importantly, the constituent materials used to manufacture the container 2 will not diminish the value or utility of the compost or humus when the container 2 degrades.

FIG. 1 illustrates the container 2 after a manufacturing process is complete according to one embodiment of the invention, in which the body of the container 2 is substantially rectangular with a triangular upper region extending therefrom. The mouth 14 extends perpendicularly from a side of the triangular upper region, onto which the cap 16 can be coupled.

Figure 2:
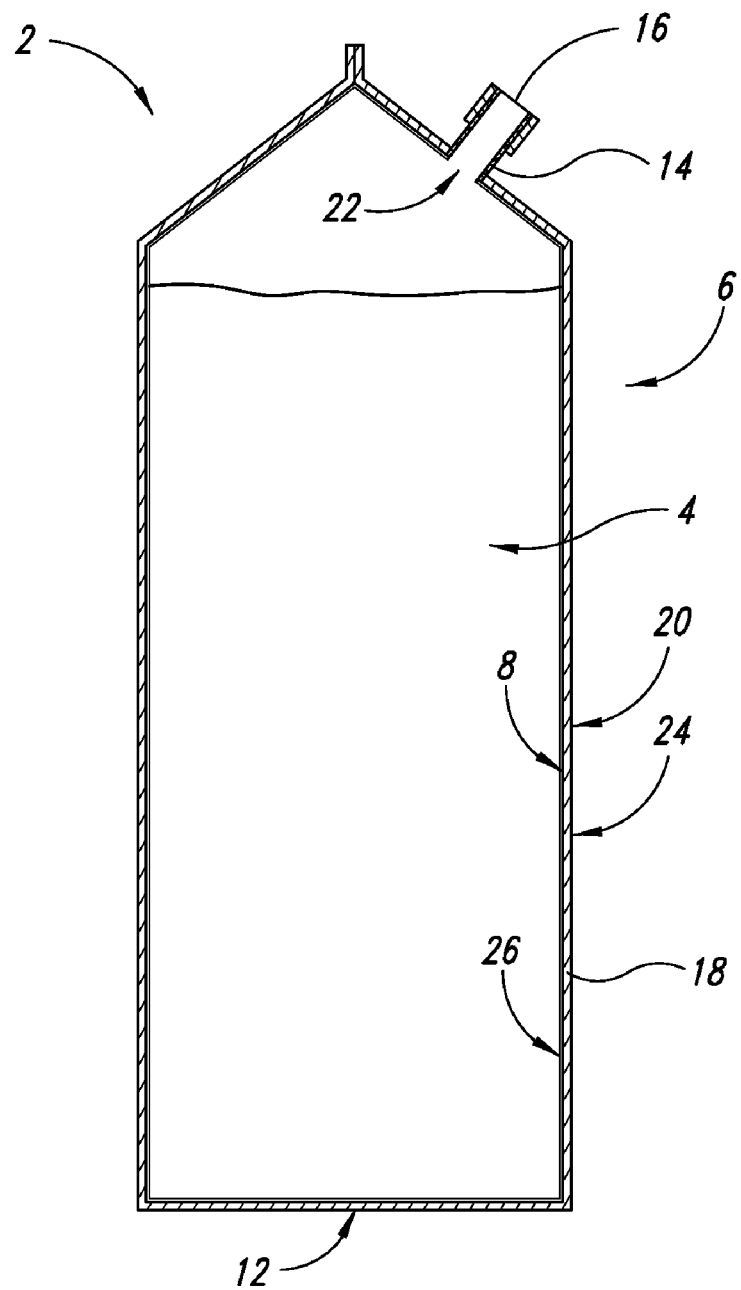
FIG. 2 is a cross-sectional side view of the biodegradable container in FIG. 1 taken through 2-2.

FIG. 2 illustrates a cross section of the container 2 in FIG. 1, taken through 2-2 that passes through the mouth 14 and the cap 16. The body 6 includes a structural layer 18 that has a first side 8 and a second side 20. In one embodiment, the compostable structural layer 18 used for the body 6 is inexpensive. The structural layer 18 is sufficiently thick and strong to provide a solid mechanical support for the container 2 and a fluid 4 held therein. While the thickness of the structural layer 18 may vary, the structural layer 18 maintains strength and provides support for the container 2 for a predetermined shelf life. Additionally, the structural layer 18 has excellent backyard biodegradability or compostability properties, being made of substances that can rapidly break down into organic matter in a matter of days when placed outdoors in natural environmental conditions where it is subjected to ambient temperatures, sun light, moisture, and microorganisms. The structural layer 18 may be configured to neither dissolve nor disintegrate prior to a selected expiration date so that the container 2 maintains structural integrity from the manufacturer until the consumer consumes the contents 4.

The first side 8 of the structural layer 18 is covered by a fluid barrier layer 10 that forms an interior surface 26 of the body 6. The fluid barrier layer 10 may be substantially thinner than the structural layer 18. The second side 20 of the structural layer 18 forms an exterior surface 24 of the body 6. The interior surface 26 protects the structural layer 18 from fluid 4 stored in the body 6. The second side 20 of this structural layer 18 is not covered with any additional insulating layers and hence is directly exposed to its immediate environment. The absence of a resistance to outdoor conditions increases its breakdown when placed in natural environmental conditions. In contrast, if placed in standard commercial distribution conditions, such as on a warehouse shelf, in a retail store, or stored at home in a substantially dry and room temperature setting, the structural layer 18 is capable of having a long lasting shelf life that can amount to several months to a few years. The selected structural layer 18 is one that has excellent mechanical strength and durability when dry, but when wet, will rapidly degrade over a matter of days. In addition, the structural layer 18 may break down more quickly when subjected to direct UV rays from the sun.

An opening 22 is formed through the fluid barrier layer 10 and the structural layer 18. The mouth 14 attaches to the opening 22 and forms a watertight seal. The mouth 14 cooperates with the fluid barrier layer 10 to create the seal to prevent moisture from interacting with the structural layer 18.

The container 2 can be formed by a single sheet of the structural layer 18 that is then coated or laminated with the fluid barrier layer 10. Subsequently, the single sheet is cut and manipulated to form the body 6 having the opening 22 through the fluid barrier layer 10 and the structural layer 18. The mouth 14 may be coupled to the opening 22 before or after the body 6 is constructed.

According to various embodiments of the present invention, the compostable container 2 can be fixed into different shapes.

Figure 3:
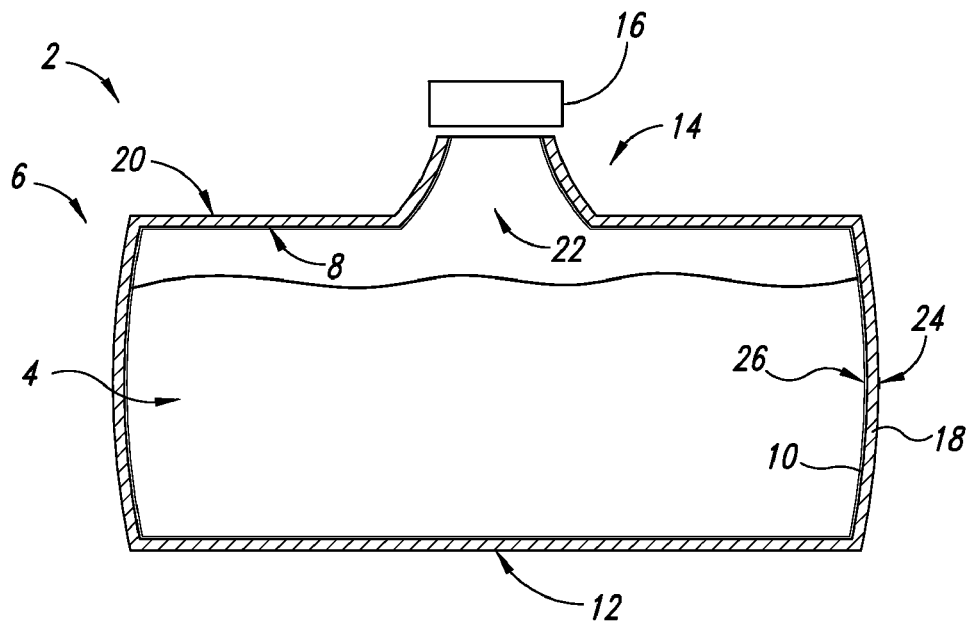
FIG. 3 is a front view of a biodegradable container according to one embodiment of the invention, the container having a rectangular body and a mouth extending from the upper region of the body.

FIG. 3 illustrates another embodiment of the invention, in which the container 2 has a rectangular body 6 and a mouth 14 extending axially from the upper region of the body 6, onto which a cap 16 is coupled.

Figure 4:
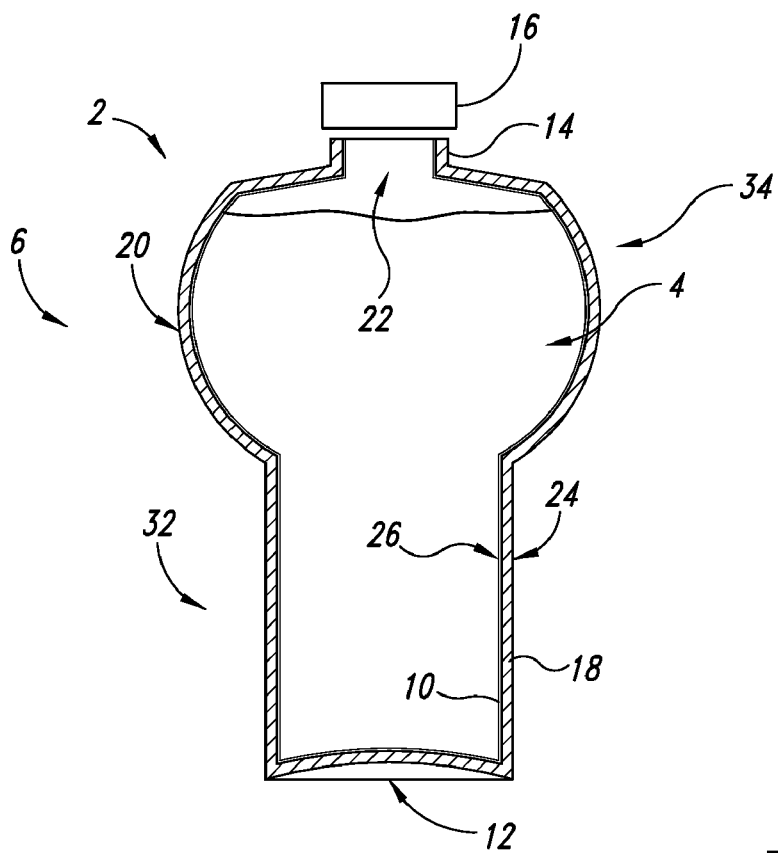
FIG. 4 is a cross-sectional view of a biodegradable container according to another embodiment of the invention, the container having a body with a rectangular lower end, a round shaped upper region, and a short mouth extending from the upper region.

FIG. 4 illustrates yet another embodiment of the invention, in which the container 2 has a body 6 with a rectangular lower end 32, a round shaped upper region 34, and a short mouth 14 extending axially from the upper region, and a cap 16 configured to be coupled to the mouth 14.

The structural layer 18 may be formed of a plant-based fiber that can be manipulated to form a rigid structure. Fibers or pulp from sugarcane, bagasse (fiber waste after sugarcane stalks are crushed to extract the juice), wood, bamboo, molded pulp, or recycled paper or slurry can be manipulated to form the structural layer 18. Alternatively or additionally, starch-based materials can be included to form the rigid structural layer 18. The material used for the structural layer 18 degrades naturally having an adequate level of inherent biodegradation and no adverse impact on the ability of composts to support plant growth. More particularly, the materials do not include any petroleum-based plastic fibers, plastic polymers, or other petroleum-based products.

Fiber or pulp-based products can be manufactured in a variety of ways. Thick-walled products have walls in the range of $3/16$ to $1/2$ inches in thickness with a rough side and a relatively smooth side. Inexpensive single pass molds may be used to form containers from mixed recovered paper and craft paper slurries. Transfer molded products have thinner walls in the range of 1/16 to 3/16 inches. The process uses transfer molds that produce a relatively smooth surface on a first side and a smoother surface on a second side. Alternatively, thermoformed fiber products are thin-walled. The product is cured while it is still in the mold. This process produces strong, smooth-surfaced molded pulp products. An additional method of manufacture is processed molded pulp products. The thick-walled, transfer molded, and thermoformed fiber products undergo a secondary processing after the basic production process. Secondary processes include coating, printing, hot-pressing, die-cutting, trimming, or coloring.

Starch-based products include corn, maize, wheat, cassaya, potato, or potato and tapioca blend. These products can be formed by a variety of methods, including compression forming, foaming, and injection molding. The starch content of these starch-based products should exceed 60% to achieve more significant material breakdown. Higher starch content products degrade more quickly and create less recalcitrant residues. Many starch-based polymers are blended with high-performance polymers to achieve necessary performance. However, these high-performance polymers can degrade into undesirable residues. Starch-based products may be incorporated into the structural layer 18 or the fluid barrier layer 10, if nontoxic residues remain after the container breaks down. Some starch products that may be incorporated into the structural layer are thermoplastic starch products, starch synthetic aliphatic polyester blends, starch and polybutylene succinate blends, starch and polybutylene succinate adipate blends, and starch polyvinyl alcohol blends.

The fluid barrier layer 10 is biodegradable and formed from non-petroleum-based materials. For example, the fluid barrier layer 10 may be formed of cellulose acetate products, i.e., wood pulp. The cellulose acetate products can be heat sealed to offer gas barrier properties and can be tailored to achieve a range of moisture barrier properties. These products can be used for lamination on the structural layer 18. Alternatively or additionally, products made from whole grain cereals, such as those produced by Biolice, may be used to form the fluid barrier layer 10. Extrusion equipment can be used to manipulate Biolice products.

Zein, a corn gluten product, may also be used for the fluid barrier 10. Zein is a prolamine protein found in corn that is manufactured into a powder. The powder can be manipulated to form film coatings that have moisture resistant properties. The zein powder can also be manipulated to form resins and other polymers that can be extruded or rolled into a variety of products.

Bioplastics refer to two different types of plastics: plastics based on renewable resources, and biodegradable and compostable plastics. Not all bioplastics degrade into nontoxic residues that are environmentally benign. In addition, some bioplastics will degrade only in commercial composting facilities. Bioplastics that undergo degradation by natural biological processes to yield carbon dioxide, water, inorganic compounds, and biomass, may be used in the formation of the components of the container 2.

As an alternative, the fluid barrier layer 10 may be a coating where only a minimal amount of biodegradable polyester is necessary to provide an isolating layer between the structural layer 18 and the fluid 4 held within the container 2. Moreover, the thin structure of the fluid barrier 10 also allows for a more rapid biodegradation. Due to its low mass it contains less resistance to biodegradation, thereby enabling a more efficient breakdown of the organic matter when exposed to natural environmental conditions. In one embodiment, the biodegradable polyester material of the fluid barrier layer 10 has a shelf life of at least six months in a standard commercial environment, and during its shelf life is insoluble in fluids and substantially exhibits a temperature resistance. During this time, the fluid barrier layer 10 provides a proper isolating layer between the structural layer 18 and the fluid 4. Subsequent to the expiration of the at least six months, the fluid barrier layer 10 becomes vulnerable to biodegradation, if in direct contact with fluids or situated in natural environmental conditions. In effect, after six months the fluid barrier layer 10 becomes soluble and subject to temperature conditions.

If exposed to the outdoor weather and environment, the container 2 will degrade rapidly. As noted, if it is holding a fluid 4, the fluid barrier layer 10 keeps the fluid 4 from degrading the structural layer 18. However, if fluid is applied to the outside of the container 2, then it will loose its mechanical strength and fall apart. The structural layer 18 may pull apart the fluid barrier layer 10 into many pieces, since the fluid barrier layer 10 does not have sufficient support for itself. The fluid barrier layer 10, once ripped or torn into many pieces, will be subject to weather from all sides. These pieces are now exposed to all weather elements on all sides and will degrade rapidly, perhaps over several days instead of weeks that would be required if the fluid barrier layer 10 remained intact.

As a further embodiment, the fluid barrier layer 10 can be quite strong and fluid resistant, but degrade rapidly, if exposed directly to infrared or UV light emitted by the sun. Since the fluid barrier layer 10 is situated only in the interior of the container 2, it will neither be exposed to sunlight nor in most conditions to artificial light. Once the structural layer 18 degrades, the fluid barrier layer 10 is exposed to sunlight, which will cause the fluid barrier layer 10 to biodegrade rapidly.

In one embodiment, a material is provided within fluid barrier layer 10 that is not affected by light from standard artificial light, such as from incandescent bulbs, fluorescent bulbs, halogen bulbs or the like. It is known that sunlight emits particular wavelengths that are not found in standard artificial lighting, most of which are in the UV A or UV B range of light. A material which is sensitive to particular sunlight emissions, but is resistant to artificial light, can be part of the fluid barrier layer 10 so that the fluid barrier layer 10 remains fully intact for a long shelf life, but once exposed to sunlight biodegrades rapidly.

The mouth 14 of the container 2 as well as the cap 16 thereto may also be made of biodegradable material based on potato starch as described with biodegradable material used for the fluid barrier layer 10. The mouth 14 and cap 16 may have the same biodegradation properties as the fluid barrier layer 10, in which case they will have a shelf life of at least six months in a standard commercial environment. During this period, the mouth 14 and the cap 16 will be substantially insoluble and temperature resistant. Alternatively, they may have different biodegradation properties, since both elements are only occasionally in contact with the fluid 4 stored in the container 2 and hence might not necessitate the same high insolubility and fluid or temperature resistance.

Figure 5A:
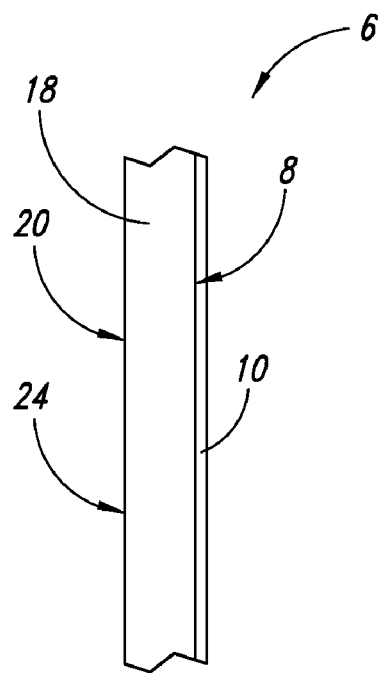
FIGS. 5A-5C are cross-sectional side views of alternative embodiments of a wall of the biodegradable container of FIGS. 1 and 2.
Figure 5C:
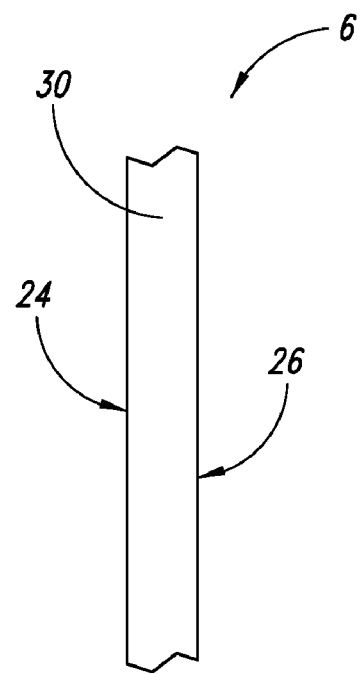
Figure 5B:
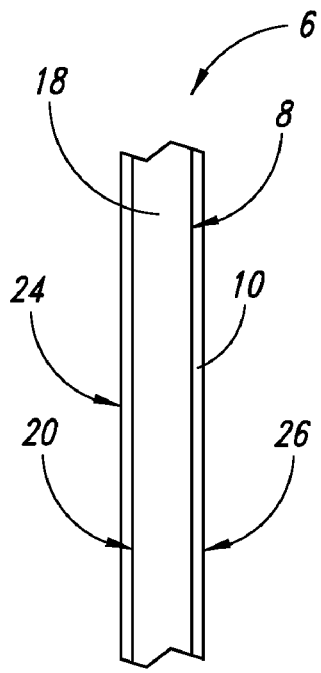

FIGS. 5A-5C illustrate alternative embodiments for forming walls of the body 6 of the container 2, i.e., a combination of the structural layer 18 and the fluid barrier layer 10. FIG. 5A illustrates the structural layer 18 having the first side 8 and the second side 20. The fluid barrier layer 10 is formed on the first side 8 of the structural layer 18. The fluid barrier layer 10 could be a sheet or film that is laminated or extruded directly onto the structural layer 18. Alternatively, the fluid barrier layer 10 could be sprayed onto the structural layer 18. The exterior surface 24 of the body 6 is formed from the second side 20 of the structural layer 18. The interior surface 26 of the body 6 is formed from the fluid barrier layer 10.

FIG. 5B illustrates an alternative embodiment that includes a protection layer 28 that forms the exterior surface 24 of the body 6. The protection layer 28 is formed on the second side 20 of the structural layer 18. The protection layer may be the same material as the fluid barrier layer 10 to provide a moisture barrier for the exterior of the body 6 of the container 2. Alternatively, the protection layer 28 may be formed of a different material that offers a different level of protection for the structural layer 18.

FIG. 5C illustrates yet another embodiment for forming the walls of the container 2. The body 6 is formed from a mixed structural and fluid barrier layer 30. During processing a structural component, such as fiber, pulp, starch, or a combination any of these, is mixed with a fluid barrier component. The mixed material is then processed into a single layer having both structural characteristics and fluid or moisture barrier characteristics.

Prior to processing, the materials used to form the structural layer 18 and the mixed structural and fluid barrier layer 30 can be pelletized resins molded together with additives, liquid resins, pulp slurries, powders, or woven components. These pre-processed materials can be manipulated to form the container 2 by injection molding, blow molding, blown film extrusion, vacuum forming, and compression molding. The fluid barrier layer may be attached or formed simultaneously during these processes. Alternatively, the fluid barrier layer may be formed after the structural layer by lamination or spray manufacturing techniques.

FIGS. 6A-6G and 7 illustrate features of an alternative embodiment. FIG. 6A illustrates a container 50 that includes a body 52 and a multipurpose lid 54 integrally formed thereon. The container 50 is a pressured formed design that can be manufactured in a variety of ways. The container 50 may be formed of a structural fiber material as described above that is molded and cured. The body 50 encloses an interior chamber having an interior surface (not shown). A film may be blown into the interior chamber of the container 50 to sufficiently cover the interior surface to render the interior chamber resistant to fluids. Alternatively, a resin could be sprayed into the interior chamber to form the fluid barrier, i.e., a coating or film on the interior surface. In another embodiment, the fiber used to form the exterior structural component of the container 50 may be blended with a fluid resistant resin prior to molding. This would result in a structural layer similar to the structural layer 30 in FIG. 5C. The blended structural component and resin may then be compression molded and cured to form a structurally sound container 50 that is fluid resistant on the interior and exterior surface.

The body 52 has a base 56 that may be formed to provide a substantially flat stable surface on which the container 50 may stand in a substantially vertical position. The body 52 has a lower portion 58 of a fluid chamber 60 that is larger than an upper portion 62. The upper portion 62 has a substantially oval cross section and forms an opening 64 (see FIG. 6B) that provides access to contents of the container.

FIG. 6B illustrates the multipurpose lid 54 that has been partially removed or lifted away from the body 52 to expose the opening 64. The multipurpose lid 54 can be completely detached from the body 52. Preferably, the container 50 is formed of material that facilitates easy removal of the multipurpose lid 54 from the body 52.

FIG. 6C illustrates an enlarged top-down view of the multipurpose lid 54 in a first position. The multipurpose lid 54 includes a first portion 66 and a second portion 68 that are configured to cooperate with the body 52 to form a seal 74 for the container 50. The seal 74 includes two seal portions 74A and 74B that are formed on the first portion 66 and the second portion 68, respectively.

FIG. 6D illustrates a cross sectional view of the multipurpose lid 54 taken through 6D-6D of FIG. 6C. The first portion 66 is integrally formed with a first oval protrusion 70 and the seal portion 74a. The second portion 68 is integrally formed with a second oval protrusion 76 and the seal portion 74b. The second oval protrusion 76 is sized and shaped to nest within a corresponding oval recess formed by the first oval protrusion 70. The second oval protrusion 76 also has a corresponding oval recess 84.

The first portion 66 is illustrated on the left side of the multipurpose lid 54. The first oval protrusion 70 extends from a first surface 72 of the first portion 66 and positioned above the seal portion 74a. FIG. 6E illustrates the first portion 66 and the second portion 68 in a separated position. The second portion 68 includes the second oval protrusion 76 that extends from a first surface 78 of the second portion 68. The first surface 78 of the second portion 68 faces a second surface 80 of the first portion 66. The first oval protrusion 70 forms the oval recess in the second surface 80 of the first portion 66 that is configured to receive the second oval protrusion 76 on the second portion 68. The seal portion 74B extends from a second surface 82 of the second portion 68.

FIG. 6F is an orthogonal view of the multipurpose lid 54 in the partially separated position illustrated in FIG. 6D. The second oval protrusion 76 is sized and shaped to securely couple to the oval recess in the second surface 80 of the first portion 66. The second oval protrusion 76 forms the oval recess 84 in the second surface 82 of the second portion 68 that can be seen in FIG. 6G.

FIG. 6G illustrates the container 2 with the second portion 68 of the multipurpose lid 54 positioned to re-seal the opening 64 in the body 52. The second oval protrusion 76 of the second portion 68 is sized and shaped to securely re-seal the opening 64. A user may depress the oval recess 84 into the opening 64 so that the second surface 82 is facing away from the body 52. The oval protrusion 76 prevents the liquid from escaping the body 52 of the container 50. The seal portion 74B extends away from the second surface 82 of the second portion 68.

The first portion 66 may be retained for future use. The body includes a cutout region 86 that is configured to cooperate with an inlet cutout 88 on the first portion 66. The second portion 68 also includes the inlet cutout 88. The inlet cutout is configured to couple the portion 66, 68 to the cutout region 86.

FIG. 7 illustrates six containers 50 coupled together for display or transport. The six containers may be manufactured as a single transportable unit or may be coupled together after manufacturing. A handle 90 may be included to assist a consumer in transporting the biodegradable containers.

While other systems require higher production costs and necessitate certain commercial conditions, the present invention offers a cost and process effective product. Not only does the present invention offer a cost effective production enabling competitive pricing of the container 2, 50, but it also eliminates the necessary processing associated with the recycling of plastic waste. Waste management collection and processing of the container 2, 50 is not necessary, since it can biodegrade in the natural environmental conditions of a person's garden, backyard, lawn, compost bin, etc. As such, specific commercial composting conditions for plastic waste are also no longer necessary, since the properties of the container 2, 50 are configured such that all elements are subject to biodegradation after at least six months, when exposed to natural environmental conditions.

Moreover, eliminating the need for recycling containers will enable individuals in regions that do not supply recycling mechanisms to conveniently switch away from petroleum-based plastic containers. Since the container 2, 50 is completely biodegradable, the burdensome separation of various elements in the waste management process, in accordance to whether they are biodegradable, can be avoided. For example, there is no longer a need to separate the body 6 from the cap 16, since both are completely biodegradable. It should also be considered that even if individuals choose not to recycle, the container 2, 50 will biodegrade in natural environmental conditions. Accordingly, even if the container 2, 50 reaches water systems or other natural habitats, the usual harm caused by plastic waste will be eliminated, since the container 2, 50 can easily biodegrade within those conditions.

The above descriptions are merely exemplary embodiments for implementing the present invention, so that the present invention is not limited thereto. The true scope of the present invention should be defined to the extent that those skilled in the art can make various modifications and changes thereto without departing from the scope of the invention, as defined by the appended claims.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, are incorporated herein by reference, in their entirety. Aspects of the embodiments can be modified, if necessary to employ concepts of the various patents, applications and publications to provide yet further embodiments.

In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A method, comprising:
    forming an ambient biodegradable container having a shelf life of twenty-four months or less, the forming of the container including:
        forming an enclosed body having an opening through an interior surface and an exterior surface, the forming of the body including:
            forming the interior surface of the enclosed body by covering a first side of an ambient biodegradable plant fiber structural layer with an ambient biodegradable fluid barrier layer, the plant fiber structural layer and the fluid barrier layer configured to degrade into nontoxic residue in ambient environmental temperatures in the range of 20 and 30 degrees Celsius;
            forming the opening through the plant fiber structural layer, the opening having a width that is smaller than an average width of the enclosed body; and
            manipulating the plant fiber structural layer to form the enclosed body; and
        coupling an ambient biodegradable mouth to the opening, the mouth in fluid communication with the interior surface of the enclosed body and configured to cooperate with the fluid barrier layer to protect the plant fiber structural layer from moisture, the mouth configured to degrade into nontoxic residue in ambient environmental temperatures in the range of 20 and 30 degrees Celsius.

2. The method of claim 1, further comprising:
    forming the fluid barrier layer by spraying a resin onto the plant fiber structural layer.

3. The method of claim 1, further comprising:
    forming the plant fiber structural layer by compression molding and curing.

4. The method of claim 1, further comprising forming the exterior surface of the enclosed body by forming an ambient biodegradable protection layer on a second side of the plant fiber structural layer, the protection layer configured to degrade into nontoxic residue in ambient environmental temperatures in the range of 20 and 30 degrees Celsius.

5. The method of claim 4 wherein the protection layer and the fluid barrier layer have the same chemical composition.

6. The method of claim 4 wherein the protection layer and the fluid barrier layer have distinct chemical compositions.

7. The method of claim 1, further comprising coupling an ambient biodegradable cap to the mouth to seal the enclosed body, the cap configured to degrade into nontoxic residue in ambient environmental temperatures in the range of 20 and 30 degrees Celsius.

8. The method of claim 1, further comprising forming the opening after manipulating the plant fiber structural layer to form the enclosed body.

9. The method of claim 1 wherein the shelf life of the container is six months.

10. The method of claim 1 wherein the plant fiber structural layer, the fluid barrier layer, and the mouth degrade into carbon dioxide, water, and benign biomass.

11. A method, comprising:
    forming an ambient biodegradable sealable container having a shelf life of about twenty-four months or less in standard indoor storage conditions, the container having an enclosed body and a sealable opening, forming the container including:
        forming a water resistant surface by forming an ambient biodegradable fluid barrier layer on a first side of an ambient biodegradable plant fiber structural layer, the structural layer and the fluid barrier layer being configured to degrade into nontoxic residue in ambient outdoor temperatures in the range of 20 and 30 degrees Celsius;
        forming the opening through the structural layer and the fluid barrier layer;
        manipulating the structural layer to completely enclose the fluid barrier layer within the enclosed body; and
        coupling an ambient biodegradable mouth to the opening, the mouth in fluid communication with the fluid barrier layer of the enclosed body to protect the structural layer from moisture, the mouth being configured to degrade into nontoxic residue in ambient outdoor temperatures in the range of 20 and 30 degrees Celsius.

12. The method of claim 11 wherein the container has a shelf life of around six months.

13. The method of claim 11 wherein the plant fiber structural layer, the fluid barrier layer, and the mouth degrade into carbon dioxide, water, and benign biomass.

14. The method of claim 11 wherein the fluid barrier layer is susceptible to degradation with exposure to UV wavelengths and the structural layer and the mouth are not susceptible to degradation with exposure to the UV wavelengths.

* * * * *